(12) United States Patent
Hirose

(10) Patent No.: US 10,381,941 B2
(45) Date of Patent: Aug. 13, 2019

(54) SWITCHING POWER SUPPLY DEVICE AND SYNCHRONOUS RECTIFIER CIRCUIT

(71) Applicant: FUJITSU LIMITED, Kawasaki-shi, Kanagawa (JP)

(72) Inventor: Tatsuya Hirose, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/163,865

(22) Filed: Oct. 18, 2018

(65) Prior Publication Data
US 2019/0123655 A1    Apr. 25, 2019

(30) Foreign Application Priority Data
Oct. 25, 2017  (JP) ................. 2017-205973

(51) Int. Cl.
*H02M 3/335* (2006.01)
*H02M 1/00* (2006.01)

(52) U.S. Cl.
CPC .. *H02M 3/33592* (2013.01); *H02M 2001/009* (2013.01)

(58) Field of Classification Search
CPC ............. H02M 3/335; H02M 3/33507; H02M 3/33569; H02M 3/33576; H02M 3/33592; H02M 2001/009
See application file for complete search history.

(56) References Cited

U.S. PATENT DOCUMENTS

| 5,631,810 A | 5/1997 | Takano | |
|---|---|---|---|
| 5,999,420 A | 12/1999 | Aonuma et al. | |
| 6,577,517 B2 * | 6/2003 | Jain | H02M 1/38 363/127 |
| 6,879,499 B2 * | 4/2005 | Matsumoto | H02M 3/335 363/21.06 |
| 2010/0182806 A1 * | 7/2010 | Garrity | H02M 3/33569 363/21.14 |
| 2019/0089264 A1 * | 3/2019 | Hirose | H02M 3/33592 |

FOREIGN PATENT DOCUMENTS

| JP | 08-154375 | 6/1996 | |
|---|---|---|---|
| JP | 09-285116 | 10/1997 | |
| JP | 11055945 | * 2/1999 | .............. H02M 3/28 |
| JP | 11-235029 | 8/1999 | |
| JP | 2002-281744 | 9/2002 | |
| JP | 2003-333846 | 11/2003 | |

* cited by examiner

*Primary Examiner* — Matthew V Nguyen
(74) *Attorney, Agent, or Firm* — Fujitsu Patent Center

(57) ABSTRACT

A switching power supply device includes a transformer including a primary winding and a secondary winding, a first transistor coupled to the primary winding, a first control circuit that outputs a first control voltage, a delay circuit that delays the first control voltage and supplies the delayed first control voltage to the first transistor, a second transistor that has a first terminal coupled to the secondary winding, a diode coupled to the secondary winding, a second control circuit that outputs a third control voltage used for controlling a switching operation of the second transistor, a control voltage generation circuit that generates the second control voltage, and a delay time control circuit that determines an ON period in which the diode is switched on and controls a delay time so that the delay time by which the delay circuit delays the first control voltage is shorter for a longer ON period.

5 Claims, 12 Drawing Sheets

SWITCHING POWER SUPPLY DEVICE AND SYNCHRONOUS RECTIFIER CIRCUIT

CROSS-REFERENCE TO RELATED APPLICATION

This application is based upon and claims the benefit of priority of the prior Japanese Patent Application No. 2017-205973, filed on Oct. 25, 2017, the entire contents of which are incorporated herein by reference.

FIELD

The embodiments discussed herein are related to a switching power supply device and a synchronous rectifier circuit.

BACKGROUND

Switching power supply devices are used as alternating current/direct current (AC/DC) converters or DC/DC converters. There have been switching power supply devices in which a primary-side circuit unit (in the case of an AC/DC converter, a circuit unit which receives power from an AC power source) and a secondary-side circuit unit (in the case of a DC/DC converter, a circuit unit which outputs a DC voltage) are electrically isolated from each other and magnetically coupled to each other via a transformer. Further, as a circuit that rectifies a voltage generated on a secondary winding of the transformer, a synchronous rectifier circuit in which a transistor connected to the secondary winding (hereinafter, also referred to as a secondary-side switch) is used to switch on and off the secondary-side switch at timings in accordance with the voltage waveform of the secondary winding is employed for rectification. Note that, in recent years, in order to accurately control secondary-side switches and further improve the conversion efficiency, control circuits such as a dedicated control integrated circuit (IC) are often used.

Operation modes in such a switching power supply device are categorized into a discontinuous current mode, a critical current mode, and a continuous current mode. The discontinuous current mode is an operation mode in which the primary-side and secondary-side switches are controlled such that the current flowing in the switching transistor included in the primary-side circuit unit (hereinafter, also referred to as a primary-side switch) and the current flowing in the secondary-side switch are both 0 A for a certain period in each cycle of the current waveform. The critical current mode is an operation mode in which the primary-side and secondary-side switches are controlled such that the currents of both the switches described above are 0 A at the same point of time. The continuous current mode is an operation mode in which the primary-side and secondary-side switches are controlled such that there is no period or point of time in which the currents of both the switches described above are 0 A. In the continuous current mode, a larger output current may be obtained than in other modes.

In the continuous current mode, however, when the primary-side switch is switched on while a current flows in the load direction through the secondary-side switch, a voltage with a large positive value may be applied to the terminal of the secondary-side switch connected to the secondary winding. At this time, when the secondary-side switch remains switched on due to operation delay thereof, a large current flows to the reference potential side through the secondary-side switch, which results in a large power loss.

In the related art, intentionally delayed operation of the primary-side switch is used to avoid simultaneous switching on of the primary-side switch and the secondary-side switch.

In such an art using intentionally delayed operation of the primary-side switch, a dead time during which both the primary-side switch and the secondary-side switch are switched off occurs. To realize the continuous current mode, a diode may be connected parallel to the secondary-side switch so that a current flows to the load side in the dead time. When a silicon (Si)-metal oxide semiconductor field effect transistor (MOSFET) is used as the secondary-side switch, a diode structurally included inside the Si-MOSFET (body diode) serves the function described above.

However, since the forward voltage of such a diode is larger than a voltage between both the terminals of the secondary-side switch when switched on, an increased dead time and thus a longer period during which a current flows in the diode cause a problem of a larger power loss.

The followings are reference documents.
[Document 1] Japanese Laid-open Patent Publication No. 09-285116,
[Document 2] Japanese Laid-open Patent Publication No. 11-235029, and
[Document 3] Japanese Laid-open Patent Publication No. 2003-333846.

SUMMARY

According to an aspect of the embodiments, an apparatus includes A switching power supply device includes a transformer including a primary winding and a secondary winding, a first transistor coupled to one end of the primary winding, a first control circuit that outputs a first control voltage used for controlling a switching operation of the first transistor, a delay circuit that delays the first control voltage and supplies the delayed first control voltage to the first transistor, a second transistor that has a first terminal coupled to one end of the secondary winding, a second terminal at a reference potential, and a third terminal to which a second control voltage is applied and that performs a switching operation in accordance with the second control voltage, a diode having a cathode coupled to the one end of the secondary winding and an anode at the reference potential, a second control circuit that outputs a third control voltage used for controlling a switching operation of the second transistor in accordance with a first voltage of the first terminal, a control voltage generation circuit that generates the second control voltage in accordance with the first control voltage and the third control voltage, and a delay time control circuit that determines an ON period in which the diode is switched on in accordance with the first voltage and controls a delay time so that the delay time by which the delay circuit delays the first control voltage is shorter for a longer ON period.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Embodiments will be described below with reference to the drawings.

First Embodiment

Figure 1:
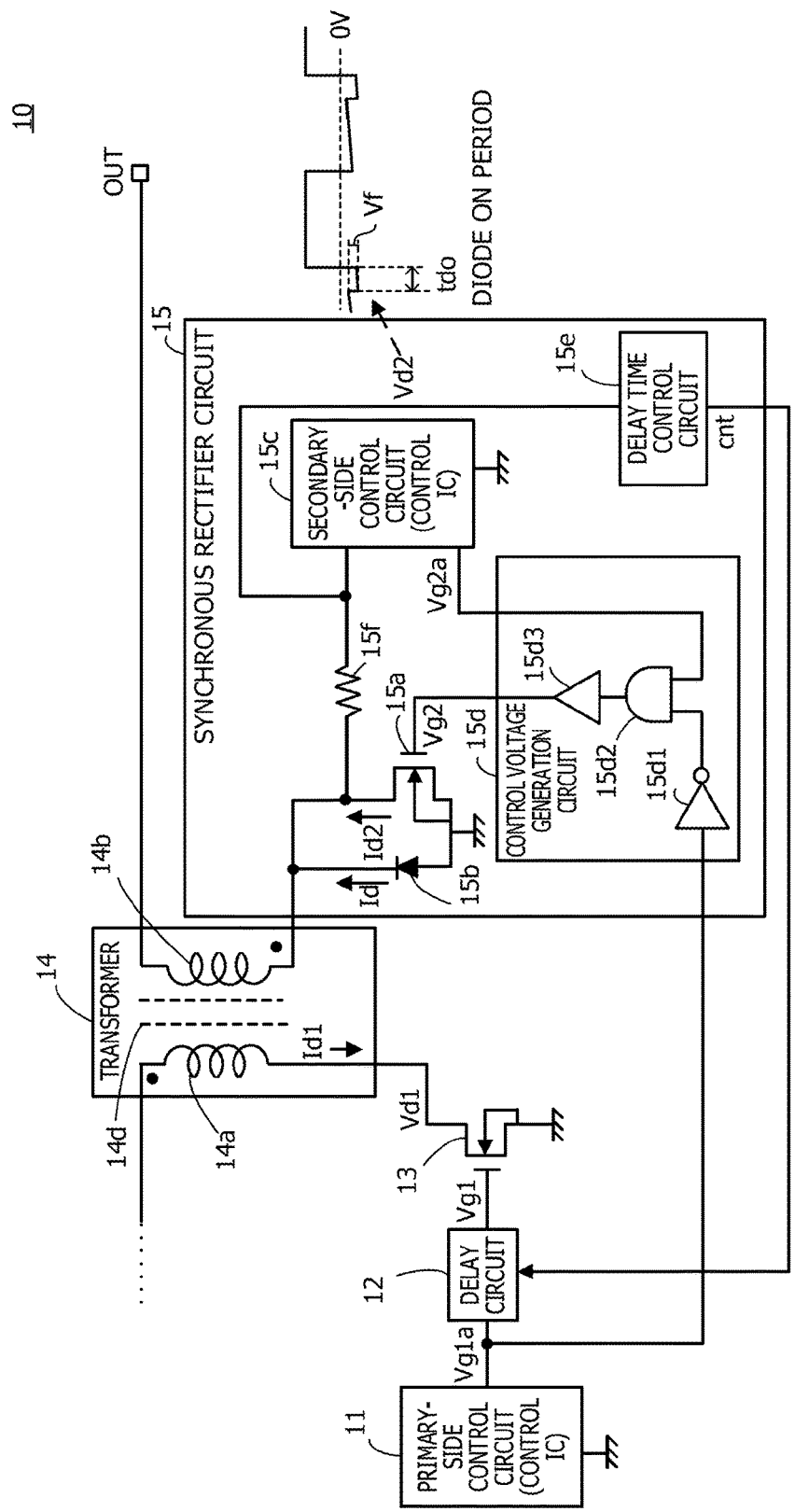
FIG. 1 is a diagram illustrating an example of a switching power supply device and a synchronous rectifier circuit of a first embodiment.

FIG. 1 illustrates an example of a switching power supply device and a synchronous rectifier circuit of a first embodiment.

A switching power supply device 10 is used as an AC/DC converter or a DC/DC converter. Further, the switching power supply device 10 is used as a point of load (POL) power supply, for example, and is able to output a current of several tens to several hundred amperes.

The switching power supply device 10 has a primary-side control circuit (hereinafter, referred to as a primary-side control IC) 11 included in the primary-side circuit unit, a delay circuit 12, and a transistor 13. Note that, in FIG. 1, illustration of other components of the primary-side circuit unit of the switching power supply device 10 is omitted. When the switching power supply device 10 is used as an AC/DC converter, a rectifier unit that rectifies an AC voltage or the like is included in the primary-side circuit unit.

The switching power supply device 10 further has a transformer 14 that electrically isolates the primary-side circuit unit and the secondary-side circuit unit from each other and magnetically couples the primary-side circuit unit and the secondary-side circuit unit to each other. Even if an electrical short-circuit occurs in the primary-side circuit unit or the secondary-side circuit unit, the transformer 14 may suppress a failure due to the short circuit from being transferred to the other side in the switching power supply device 10. The secondary-side circuit unit includes a synchronous rectifier circuit 15.

Note that the transistor 13 is an n-channel field effect transistor (FET). The FET may be a Si-MOSFET, an FET with gallium nitride (GaN), an FET with gallium arsenic (GaAs), or the like, for example.

The primary-side control IC 11 receives a power supply voltage (not illustrated) and outputs a control voltage Vg1a used for controlling the switching operation of the transistor 13 at a predetermined frequency (hereinafter, referred to as a switching frequency). For example, the primary-side control IC 11 changes the ratio of an on-time (hereinafter, referred to as a duty ratio) of the transistor 13 per cycle in accordance with which of the discontinuous current mode, the critical current mode, or the continuous current mode described above is used to operate the switching power supply device 10. The duty ratio may be changed by changing the pulse width of the control voltage Vg1a.

Note that the primary-side control IC 11 may be adapted to receive an error signal indicating an error between the output voltage (DC voltage) of the switching power supply device 10 and the expected value thereof and to adjust the duty ratio to a suitable value in accordance with the error signal.

The primary-side control IC 11 is further connected to a terminal of a reference potential (hereinafter, referred to as GND) (the reference potential is 0 V here but is not limited to 0 V). The delay circuit 12 generates a gate voltage Vg1 that is a delayed version of the control voltage Vg1a and supplies the gate voltage Vg1 to the gate terminal of the transistor 13. The delay time of delaying the control voltage Vg1a may be adjusted by a control signal cnt output from the synchronous rectifier circuit 15.

The transistor 13 has the drain terminal connected to one terminal of a primary winding 14a of the transformer 14, the source terminal connected to the GND, and the gate terminal connected to the delay circuit 12. The transistor 13 performs a switching operation in accordance with the gate voltage Vg1.

The transformer 14 has the primary winding 14a, a secondary winding 14b, and a core 14d. While schematically illustrated in FIG. 1, the primary winding 14a and the secondary winding 14b are wound around the core 14d. Note that each black circle depicted near one end of each winding indicates the start of the winding in each winding.

One end of the primary winding 14a is connected to the drain terminal of the transistor 13. While not depicted, the other end of the primary winding 14a is connected to the rectifier unit that rectifies an AC voltage when the switching power supply device 10 is an AC/DC converter or connected to a DC power source when the switching power supply device 10 is a DC/DC converter. One end of the secondary winding 14b is connected to an output terminal OUT of the switching power supply device 10. The other end of the secondary winding 14b is connected to the synchronous rectifier circuit 15.

The synchronous rectifier circuit 15 has a transistor 15a, a diode 15b, a secondary-side control circuit (hereinafter, referred to as a secondary-side control IC) 15c, a control voltage generation circuit 15d, a delay time control circuit 15e, and a resistor element 15f. Note that, as with the transistor 13, the transistor 15a is an n-channel FET.

The transistor 15a has the drain terminal connected to one end of the secondary winding 14b, the source terminal connected to the GND that is a reference potential, and the gate terminal to which a control voltage supplied from the control voltage generation circuit 15d (hereinafter, referred to as a gate voltage Vg2) is applied. The transistor 15a performs a switching operation in accordance with the gate voltage Vg2.

The diode 15b is provided so that a current flows to the load side even in a dead time during which both the primary-side switch and the secondary-side switch are switched off. The cathode of the diode 15b is connected to one end of the secondary winding 14b, and the anode thereof is connected to the GND that is the reference potential.

Note that, when the transistor 15a is a Si-MOSFET, the diode 15b may be a body diode formed inside the Si-MOSFET. The secondary-side control IC 15c is connected to the drain terminal of the transistor 15a via the resistor element 15f and detects the drain voltage Vd2 varying with a change in a drain current Id2. The secondary-side control IC 15c outputs a control voltage Vg2a used for controlling the switching operation of the transistor 15a in accordance with the drain voltage Vd2.

Note that the secondary-side control IC 15c operates with a power source voltage generated from a rectified drain voltage Vd2. The circuit that generates the power source voltage is not illustrated in FIG. 1. The secondary-side control IC 15c is further connected to the GND.

The control voltage generation circuit 15d generates the gate voltage Vg2 in accordance with the control voltage Vg1a and the control voltage Vg2a. For example, the control voltage generation circuit 15d has an inverting amplifier (inverter) 15d1, an AND (logical product) circuit 15d2, and an amplifier 15d3, as illustrated in FIG. 1. Note that, while not depicted, the above elements are connected to the output terminal OUT, for example, and may use the output voltage at the output terminal OUT as a power source voltage.

The control voltage Vg1a is supplied to the input terminal of the inverting amplifier 15d1, and the inverting amplifier 15d1 outputs a voltage having an inverted logic level of the control voltage Vg1a. The AND circuit 15d2 calculates a logical product of a voltage having an inverted logic level of the control voltage Vg1a and the control voltage Vg2a.

The amplifier 15d3 generates and outputs the gate voltage Vg2 by amplifying the output voltage of the AND circuit 15d2 to a value suitable for driving the transistor 15a. Note that the amplifier 15d3 may be omitted as long as the output voltage of the AND circuit 15d2 is already a value suitable for driving the transistor 15a (this value is different for the type of the transistor 15a).

In the control voltage generation circuit 15d as discussed above, the output voltage of the AND circuit 15d2 turns to a Low (L) level at a timing when the control voltage Vg1a turns to a High (H) level. This causes the gate voltage Vg2 to turn to the L level. Thus, the transistor 15a is switched off regardless of the control voltage Vg2a.

Note that the voltage of the H level is a voltage higher than a threshold voltage at which the transistors 13 and 15a are switched on, and the voltage of the L level is a voltage (for example, 0 V) lower than a threshold voltage at which the transistors 13 and 15a are switched off. When the transistors 13 and 15a have different threshold voltages, the voltage of the H level or the voltage of the L level may be different for the transistors 13 and 15a.

The delay time control circuit 15e determines the ON period tdo during which the diode 15b is switched on in accordance with the drain voltage Vd2 and controls the delay time such that a longer ON period tdo results in a shorter delay time by which the delay circuit 12 delays the control voltage Vg1a. As illustrated in FIG. 1, when the diode 15b is switched on, the drain voltage Vd2 decreases by the forward voltage Vf of the diode 15b (the absolute value thereof increases). The delay time control circuit 15e determines the ON period tdo in accordance with detection of such a change.

Figure 2:
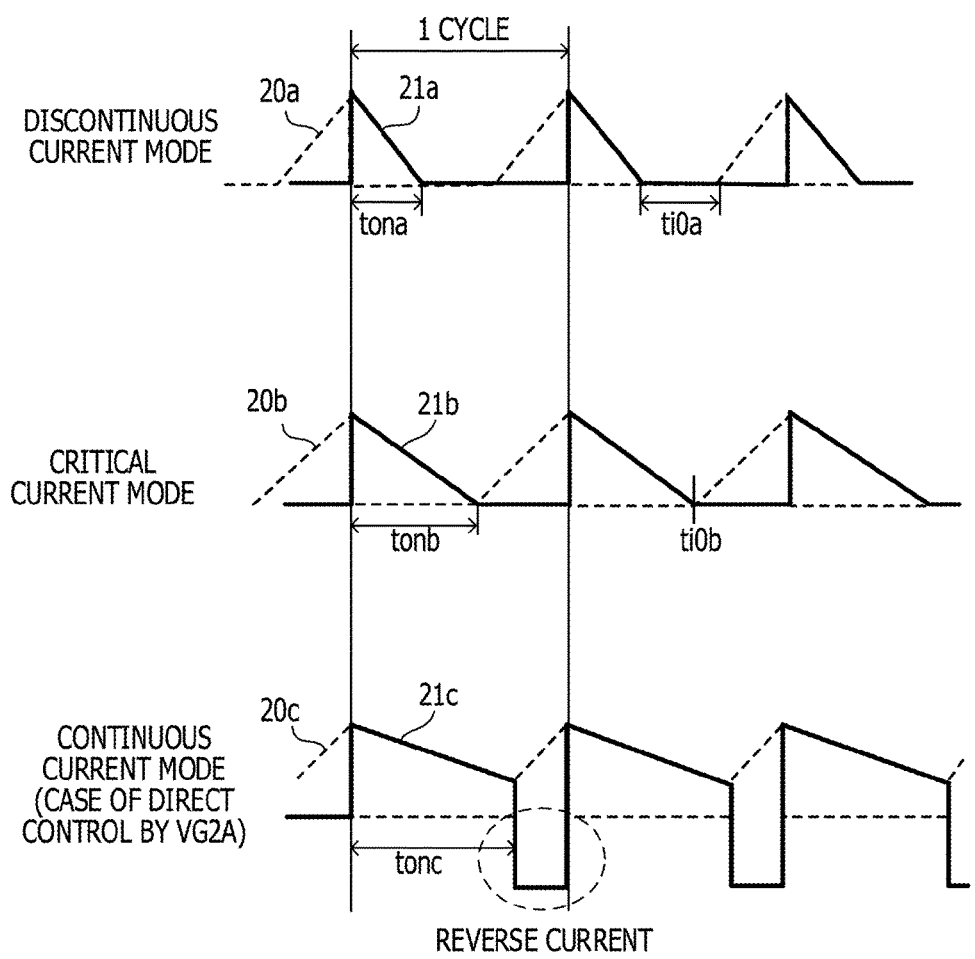
FIG. 2 is a diagram illustrating an example of current waveforms for three operation modes.

Before the operation of the switching power supply device 10 is described, the discontinuous current mode, the critical current mode, and the continuous current mode previously described will be further illustrated below. FIG. 2 is a diagram illustrating an example of current waveforms for the three operation modes.

Waveform 20a is a waveform of a drain current Id1 of the transistor 13 of the primary-side circuit unit in the discontinuous current mode, and waveform 21a is a waveform of a drain current Id2 of the transistor 15a of the synchronous rectifier circuit 15 of the secondary-side circuit unit in the discontinuous current mode. Waveform 20b is a waveform of the drain current Id1 of the transistor 13 of the primary-side circuit unit in the critical current mode, and waveform 21b is a waveform of the drain current Id2 of the transistor 15a of the secondary-side circuit unit in the critical current mode. Waveform 20c is a waveform of the drain current Id1 of the transistor 13 of the primary-side circuit unit in the continuous current mode, and waveform 21c is a waveform of the drain current Id2 of the transistor 15a of the secondary-side circuit unit in the continuous current mode.

In FIG. 2, however, the waveform 21c of the continuous current mode indicates a waveform of the drain current Id2 when the delay circuit 12, the control voltage generation circuit 15d, and the delay time control circuit 15e illustrated in FIG. 1 are not used. That is, a waveform of the drain current Id2 when the transistor 13 is driven directly by the control voltage Vg1a and the transistor 15a is controlled directly by the control voltage Vg2a. This is illustrated for comparison with a case where the delay circuit 12, the control voltage generation circuit 15d, and the delay time control circuit 15e described later are used.

Note that, in the description below, the drain current Id1 flowing from the drain terminal to the source terminal (terminal connected to the GND) of the transistor 13 is a positive value. On the other hand, the drain current Id2 flowing from the source terminal to the drain terminal of the transistor 15a (flowing in the direction of the output terminal OUT) is a positive value.

In the discontinuous current mode, there is a period ti0a during which both the drain currents Id1 and Id2 of the transistors 13 and 15a are 0 A. In the critical current mode, there is a timing ti0b at which both the drain currents Id1 and Id2 of the transistors 13 and 15a are 0 A. In contrast, in the continuous current mode, there is no period when both the drain currents Id1 and Id2 of the transistors 13 and 15a are 0 A.

Further, as illustrated in FIG. 2, in the periods tona, tonb, and tonc during which the transistor 15a is switched on, the period tona of the discontinuous current mode is the shortest, and the period tonc of the continuous current mode is the longest.

When the transistor 15a is directly driven by the control voltage Vg2a, a reverse current (current flowing in the direction from the drain terminal to the source terminal) may flow immediately after the period tonc, as illustrated in FIG. 2. The reason for this will be described below.

In response to the gate voltage Vg1 of the transistor 13 rising from an L level to an H level, the transistor 13 is switched on, the drain current Id1 flows in the direction from the drain terminal to the source terminal, and magnetic energy is accumulated in the transformer 14. At this time, the drain voltage Vd1 is 0 V. In response to the gate voltage Vg1 falling from the H level to the L level, the transistor 13 is switched off, and the drain current Id1 is 0 A. At this time, the drain voltage Vd1 increases from 0 V.

Further, upon the transistor 13 being switched off, first, the magnetic energy accumulated in the transformer 14 causes the diode 15b to be switched on, and a diode current Id flows in the direction from the anode to the cathode. At this time, the drain voltage Vd2 changes to a negative value, and when detecting this change, the secondary-side control IC 15c controls the control voltage Vg2a to rise from the L level to the H level.

When the drain voltage Vd2 increases in response to a decrease in the drain current Id2 and exceeds a certain threshold, the secondary-side control IC 15c controls the control voltage Vg2a to fall from the H level to the L level. However, before the drain voltage Vd2 exceeds the threshold (before the accumulated magnetic energy completely depletes), the transistor 13 is switched on, and thereby the drain voltage Vd1 decreases to 0 V. Thereby, in the secondary-side circuit unit, even though the control voltage Vg2a is the H level (even though the transistor 15a is in the on state), the drain voltage Vd2 increases to a high positive value. Thus, a large reverse current flows in the direction from the drain terminal to the source terminal of the transistor 15a. That is, a state where a large current is pulled from the load side (output terminal OUT side) to the transistor 15a side occurs, and a large power loss is caused due to a high drain voltage and a large reverse current.

Figure 3:
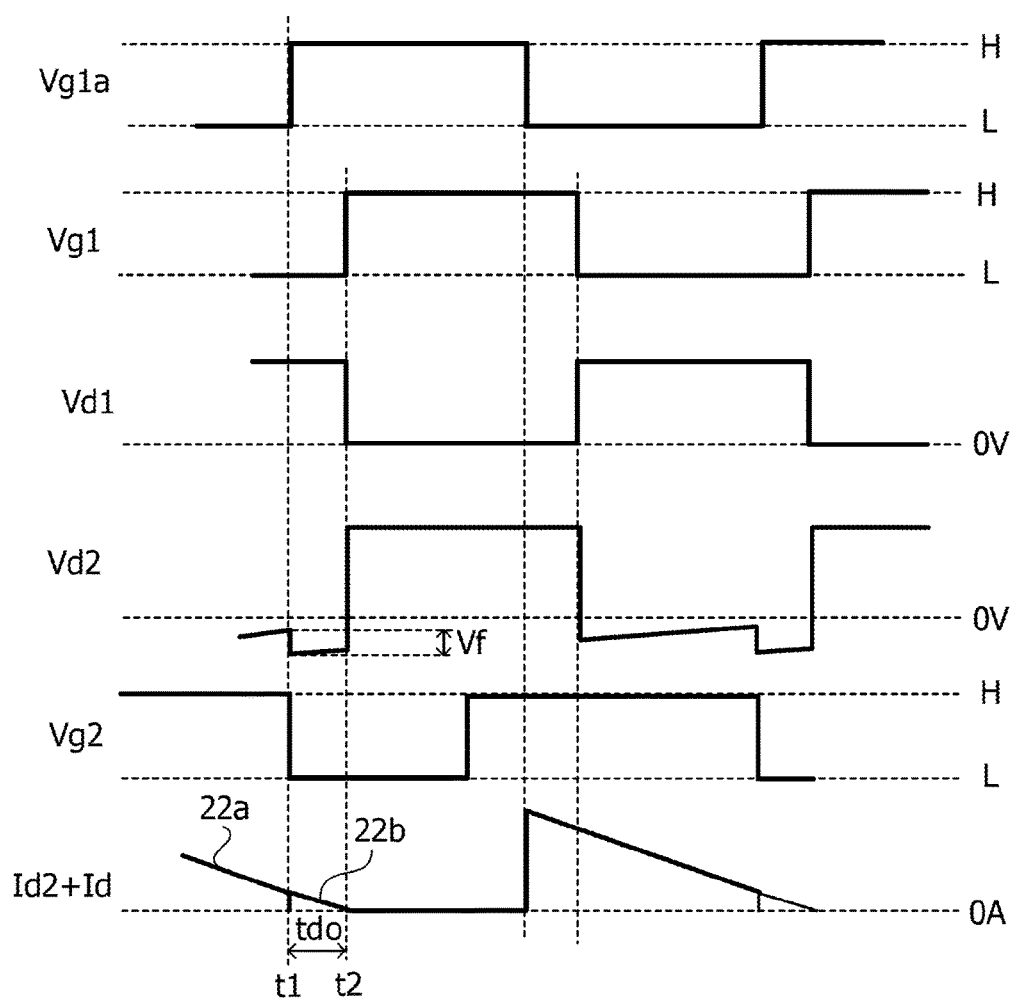
FIG. 3 is a diagram illustrating an example of operation waveforms of the switching power supply device when a delay circuit and a control voltage generation circuit are used.

To reduce such a power loss due to the reverse current, the delay circuit 12 and the control voltage generation circuit 15d are provided as illustrated in FIG. 1. FIG. 3 is a diagram illustrating an example of operation waveforms of a switching power supply device when a delay circuit and a control voltage generation circuit are used. FIG. 3 illustrates waveforms of the control voltage Vg1a, the gate voltage Vg1 output by the delay circuit 12, the drain voltages Vd1 and Vd2, the gate voltage Vg2, the drain current Id2, and the diode current Id from the top. In FIG. 3, the horizontal axis represents time, the vertical axis represents voltage in the graph which illustrates a voltage waveform and represents current in the graph which illustrates a current waveform.

Note that FIG. 3 illustrates operation waveforms when the delay time control circuit 15e illustrated in FIG. 1 is not used. This is illustrated for the purpose of comparison with an operation when the delay time control circuit 15e described later is used.

In response to the control voltage Vg1a rising from the L level to the H level (timing t1), the output voltage of the AND circuit 15d2 of the control voltage generation circuit 15d turns to the L level. This causes the gate voltage Vg2 to turn to the L level. This causes the transistor 15a to be switched off. After the gate voltage Vg1 rises from the L level to the H level (timing t2) and before the transistor 13 is switched on, the transistor 15a is switched off, and thereby an occurrence of a reverse current in the drain current Id2 of the transistor 15a illustrated by the waveform 22a is suppressed.

From the timing t1 to the timing t2, however, a dead time during which both the transistors 13 and 15a are switched off occurs, and thereby the diode current Id illustrated by the waveform 22b flows. When the diode current Id flows, the drain voltage Vd2 drops by the forward voltage Vf of the diode 15b.

The forward voltage Vf of the diode 15b (the absolute value thereof is around 0.7 V) is larger than the drain voltage Vd2 of the switched-on transistor 15a (the absolute value thereof is around several millivolts). This results in a longer dead time during which both the transistors 13 and 15a are switched off and a longer period in which the diode current Id flows, and therefore the power loss increases.

The switching power supply device 10 of the first embodiment reduces such a period in which the diode current Id flows as described below. As illustrated in FIG. 1, the delay time control circuit 15e determines the ON period tdo of the diode 15b (the period from the timing t1 to the timing t2 in FIG. 3) in accordance with the drain voltage Vd2. As described above, since the diode current Id flows and thereby the drain voltage Vd2 drops by the forward voltage Vf of the diode 15b, the delay time control circuit 15e may determine the ON period tdo in accordance with the drain voltage Vd2. An example scheme of determination of the ON period tdo will be described later.

The delay time control circuit 15e then controls the delay time so that a longer ON period tdo results in a shorter delay time by which the delay circuit 12 delays the control voltage Vg1a. When the delay circuit 12 determines a shorter delay time for a higher voltage value of the control signal cnt, the delay time control circuit 15e outputs the control signal cnt having a higher voltage value for a longer ON period tdo.

As illustrated in FIG. 3, the shorter the delay time of the control voltage Vg1a is, the shorter the ON period tdo is. Thus, the delay time control circuit 15e controls the delay time to be shorter for a longer ON period tdo, and thereby the ON period tdo of the diode 15b per cycle of the switching operation of the transistor 15a is minimized. This may reduce the power loss due to the diode current Id.

Further, during a dead time, since the diode current Id flows, an increase in the voltage between the drain terminal and the source terminal of the transistor 15a is suppressed, which may avoid destruction of the transistor 15a.

Note that, when the switching power supply device 10 is used as a POL power supply, the transistor 15a is increased in size for supporting a large current of several tens to several hundred amperes, and the parasitic capacitance thereof is also increased. A larger parasitic capacitance leads to a longer period for charging and discharging charges to and from the parasitic capacitance during a switching operation, and a reverse current is likely to occur in the synchronous rectifier circuit 15 unless suitably controlling the drive timing of the transistor 13. In the switching power supply device 10 of the first embodiment, by the delay time control circuit 15e controlling the delay time of the delay circuit 12 as described above, it is possible to still ensure a dead time but minimize the dead time. It is therefore possible to avoid occurrence of a reverse current to cut a power loss due to the reverse current and it is also possible to cut a power loss due to the diode current Id.

Second Embodiment

Figure 4:
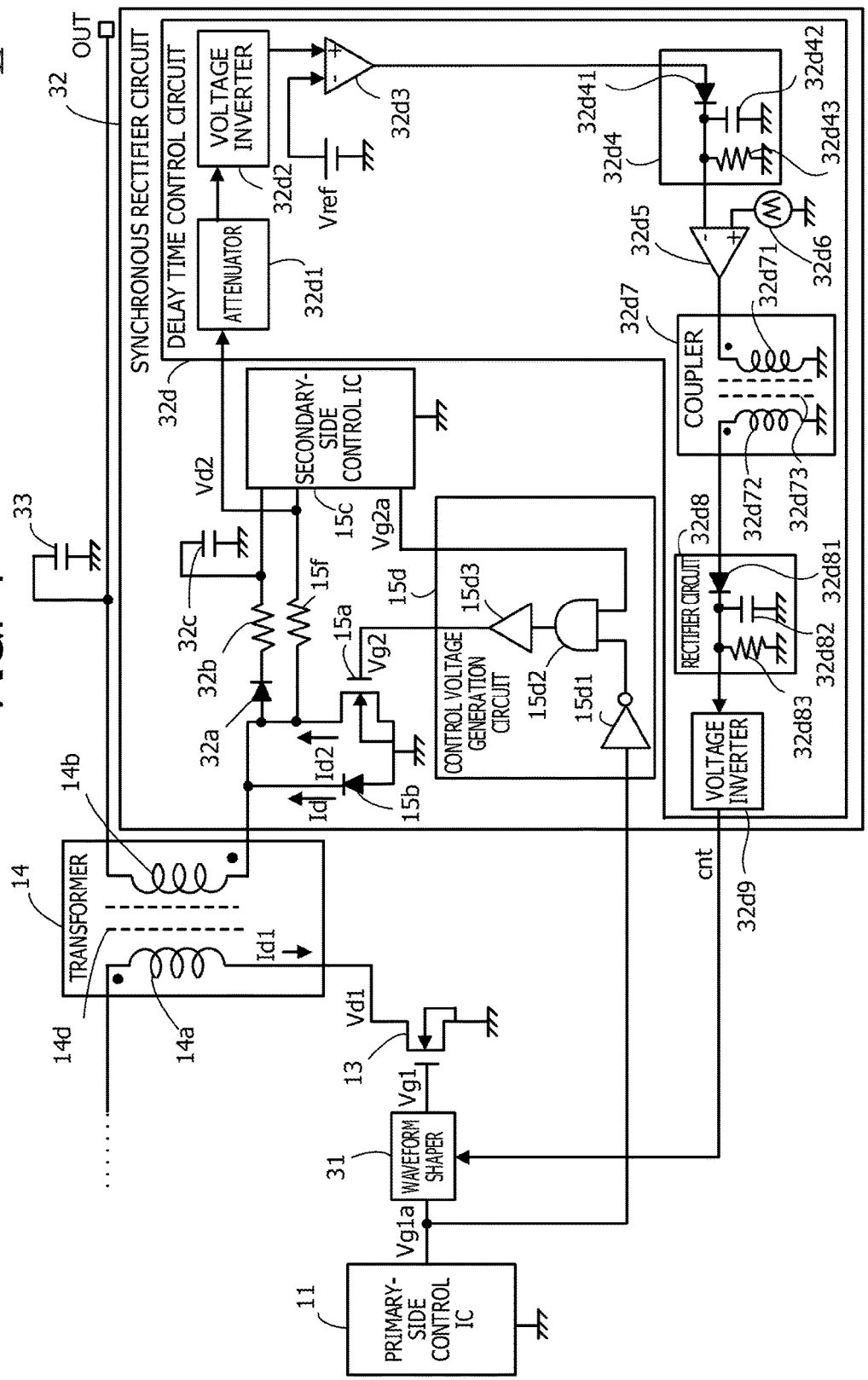
FIG. 4 is a diagram illustrating an example of a switching power supply device of a second embodiment.

FIG. 4 is a diagram illustrating an example of a switching power supply device of a second embodiment. In FIG. 4, the same elements as those illustrated in FIG. 1 are labeled with the same references.

A switching power supply device 30 has a waveform shaper 31 that is an example of the delay circuit 12 illustrated in FIG. 1. The waveform shaper 31 changes a voltage waveform of the control voltage Vg1a, which is a rectangular wave output by the primary-side control IC 11, at a degree in accordance with the control signal cnt and thereby outputs the gate voltage Vg1 having rising time and falling time delayed from the control voltage Vg1a.

Figure 5:
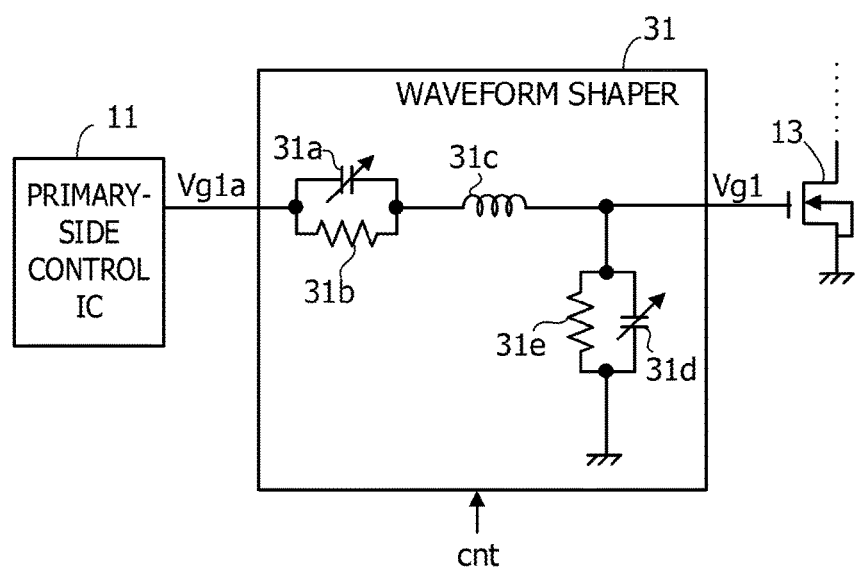
FIG. 5 is a diagram illustrating an example of a waveform shaper.

FIG. 5 is a diagram illustrating an example of a waveform shaper. The waveform shaper 31 has a variable capacitor element 31a, a resistor element 31b, an inductor element 31c, a variable capacitor element 31d, and a resistor element 31e.

One end of a parallel circuit of the variable capacitor element 31a and the resistor element 31b is connected to the primary-side control IC 11, and the other end is connected to the gate terminal of the transistor 13 via the inductor element 31*c*.

One end of a parallel circuit of the variable capacitor element 31*d* and the resistor element 31*e* is connected to the gate terminal of the transistor 13, and the other end is connected to the GND. Each of the variable capacitor elements 31*a* and 31*d* is a varactor diode, for example, and changes the capacitance value thereof in accordance with the voltage value of the control signal cnt. In the description below, each of the variable capacitor elements 31*a* and 31*d* has a smaller capacitance value for a higher voltage value of the control signal cnt.

In such the waveform shaper 31, the gate voltage Vg1 having a smaller delay of rising time and falling time relative to the control voltage Vg1*a* is generated for a larger voltage value of the control signal cnt.

Figure 6:
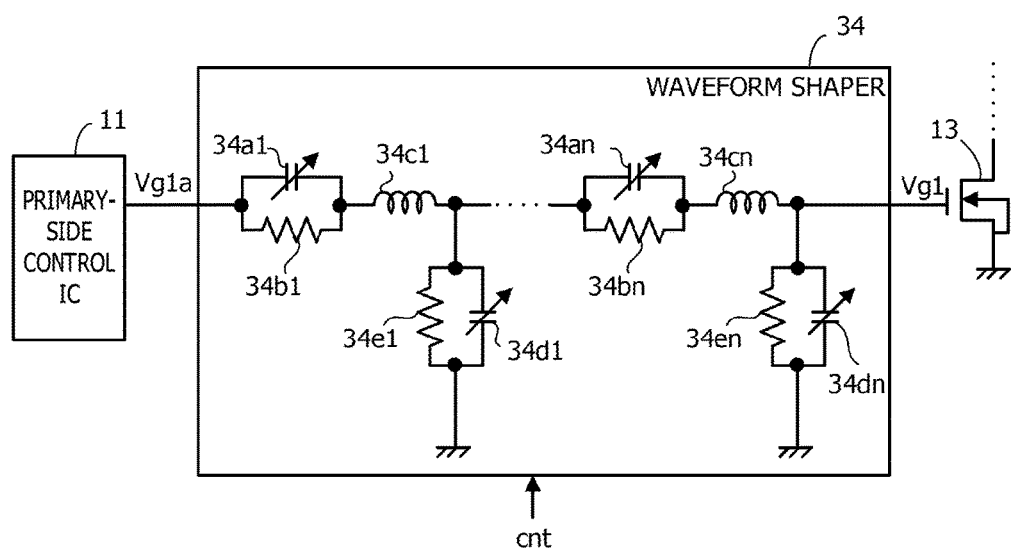
FIG. 6 is a diagram illustrating another example of a waveform shaper.

FIG. 6 is a diagram illustrating another example of a waveform shaper. The waveform shaper 34 has variable capacitor elements 34*a*1 to 34*an*, resistor elements 34*b*1 to 34*bn*, inductor elements 34*c*1 to 34*cn*, variable capacitor elements 34*d*1 to 34*dn*, and resistor elements 34*e*1 to 34*en*.

The waveform shaper 34 is a circuit in which n stages (n is greater than one) of the same circuits as the waveform shaper 31 illustrated in FIG. 5 are connected in series between the primary-side control IC 11 and the gate terminal of the transistor 13.

Figure 7:
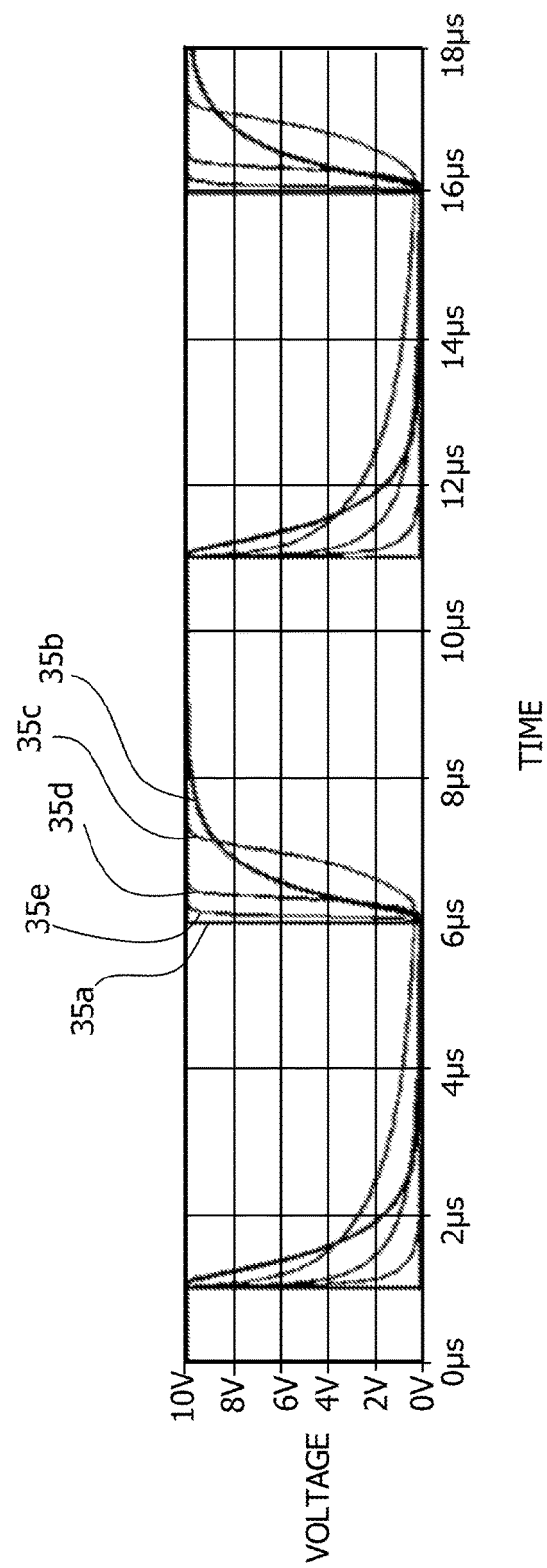
FIG. 7 is a diagram illustrating an example of the input waveform and the output waveform of a waveform shaper.

The use of the waveform shaper 34 instead of the waveform shaper 31 illustrated in FIG. 5 enables adjustment of the delay amount by a finer resolution than in the case of the waveform shaper 31. FIG. 7 is a diagram illustrating an example of the input waveform and the output waveform of the waveform shaper. In FIG. 7, the horizontal axis represents time, and the vertical axis represents voltage.

An input waveform 35*a* indicates a temporal change of the control voltage Vg1*a* input to the waveform shaper 31 or the waveform shaper 34. Output waveforms 35*b*, 35*c*, 35*d*, and 35*e* indicate temporal changes of the gate voltage Vg1 output from the waveform shaper 31 or the waveform shaper 34.

For example, the output waveform 35*b* indicates a temporal change of the gate voltage Vg1 when control of the delay time by using the control signal cnt is not performed in the waveform shaper 31 or the waveform shaper 34. When control of the delay time by using the control signal cnt is performed, as the voltage value of the control signal cnt increases, delay of rising time decreases as indicated by the output waveforms 35*c*, 35*d*, and 35*e*, for example.

Turning back to FIG. 4. In the synchronous rectifier circuit 32, the diode 32*a*, the resistor element 32*b*, and the capacitor element 32*c* generate a power source voltage that is a DC voltage used for operating the secondary-side control IC 15*c*.

The anode of the diode 32*a* is connected to the secondary winding 14*b*, and the cathode is connected to one end of the resistor element 32*b*. The other end of the resistor element 32*b* is connected to one end of the capacitor element 32*c* and the power source terminal of the secondary-side control IC 15*c*. The other end of the capacitor element 32*c* is connected to the GND.

The delay time control circuit 32*d* has an attenuator 32*d*1, a voltage inverter 32*d*2, a comparator 32*d*3, a rectifier circuit 32*d*4, a comparator 32*d*5, a reference signal source 32*d*6, a coupler 32*d*7, a rectifier circuit 32*d*8, and a voltage inverter 32*d*9.

The attenuator 32*d*1 attenuates the drain voltage Vd2 to a value suitable to be input to the voltage inverter 32*d*2. The attenuator 32*d*1 may be implemented by using a resistor element, for example. The voltage inverter 32*d*2 inverts the polarity (positive/negative) of a voltage value of the output signal of the attenuator 32*d*1. The voltage inverter 32*d*2 is an inverting amplifier, for example.

The comparator 32*d*3 outputs a comparison result between the voltage value of the output signal of the voltage inverter 32*d*2 supplied to the non-inverting input terminal and the reference voltage Vref applied to the inverting input terminal. The comparator 32*d*3 outputs an H level signal when the voltage value of the output signal of the voltage inverter 32*d*2 is greater than the reference voltage Vref and outputs an L level signal when the voltage value of the output signal of the voltage inverter 32*d*2 is less than the reference voltage Vref.

The reference voltage Vref is preset so as to be a value resulted by multiplying an attenuation rate in the attenuator 32*d*1 by the product of the drain current Id2 and the on-resistance of the transistor 15*a* when the transistor 15*a* is in the on state.

The rectifier circuit 32*d*4 rectifies the output signal of the comparator 32*d*3 and outputs a DC voltage. The rectifier circuit 32*d*4 has a diode 32*d*41, a capacitor element 32*d*42, and a resistor element 32*d*43, for example, as illustrated in FIG. 4. The anode of the diode 32*d*41 is connected to the output terminal of the comparator 32*d*3, and the cathode of the diode 32*d*41 is connected to the inverting input terminal of the comparator 32*d*5. One end of the capacitor element 32*d*42 and one end of the resistor element 32*d*43 are connected to the cathode of the diode 32*d*41, and the other end of the capacitor element 32*d*42 and the other end of the resistor element 32*d*43 are connected to the GND.

The comparator 32*d*5 outputs a result of comparison between the DC voltage supplied to the inverting input terminal thereof and a reference signal supplied to the non-inverting input terminal. The comparator 32*d*5 outputs an L level signal when the DC voltage is greater than the voltage of the reference signal and outputs an H level signal when the DC voltage less than the voltage of the reference signal.

The reference signal source 32*d*6 generates a signal having a triangular voltage waveform (for example, a sawtooth wave signal) as the reference signal. The reference signal source 32*d*6 may generate a reference signal having the same frequency as the frequency synchronized with the control voltage Vg1*a* output by the primary-side control IC 11 or may generate a reference signal having a separate frequency of one to ten times the frequency of the control voltage Vg1*a*. The amplitude of the reference signal is set such that, when the DC voltage output from the rectifier circuit 32*d*4 is 0 V, the duty ratio of the output signal of the comparator 32*d*5 is 0.5, for example.

The coupler 32*d*7 transfers the output signal of the comparator 32*d*5 to the rectifier circuit 32*d*8. In addition, the coupler 32*d*7 is adapted to electrically isolate the output terminal of the comparator 32*d*5 and the input terminal of the rectifier circuit 32*d*8 from each other so that an electrical short-circuit occurring in one of the primary side and the secondary side does not affect the other.

The coupler 32*d*7 is a transformer, for example, as illustrated in FIG. 4 and has windings 32*d*71 and 32*d*72 and a core 32*d*73. One end of the winding 32*d*71 is connected to the output terminal of the comparator 32*d*5, and one end of the winding 32*d*72 is connected to the input terminal of the rectifier circuit 32*d*8. The other ends of the windings 32*d*71 and 32*d*72 are connected to the GND. While schematically illustrated in FIG. 4, the windings 32*d*71 and 32*d*72 are wound around the core 32*d*73. Note that the coupler 32*d*7 may be a photocoupler or the like.

The rectifier circuit 32*d*8 rectifies the output signal of the comparator 32*d*5 transferred via the coupler 32*d*7 and outputs a DC voltage. The rectifier circuit 32*d*8 may be implemented by using the same circuit as the rectifier circuit 32*d*4 and has a diode 32*d*81, a capacitor element 32*d*82, and a resistor element 32*d*83.

The voltage inverter 32*d*9 outputs the control signal cnt having a lower voltage value for a higher DC voltage output by the rectifier circuit 32*d*8. The voltage inverter 32*d*9 is an inverting amplifier, for example.

The delay time control circuit 15*e* of the synchronous rectifier circuit 15 illustrated in FIG. 1 may be implemented by using the same circuit as the delay time control circuit 32*d*. The capacitor element 33 of the switching power supply device 30 is provided to reduce a ripple voltage. One end of the capacitor element 33 is connected to the output terminal OUT, and the other end is connected to the GND.

The operation of the delay time control circuit 32*d* in the synchronous rectifier circuit 32 of the switching power supply device 30 described above will be described below. Other operations are the same as those in the switching power supply device 10 of the first embodiment.

The drain voltage Vd2 is attenuated by the attenuator 32*d*1 and is supplied to the voltage inverter 32*d*2 as a voltage proportional to the drain voltage Vd2. The output signal of the voltage inverter 32*d*2, the reference voltage Vref, and the output signal of the comparator 32*d*3 are observed as below, for example.

Figure 8:
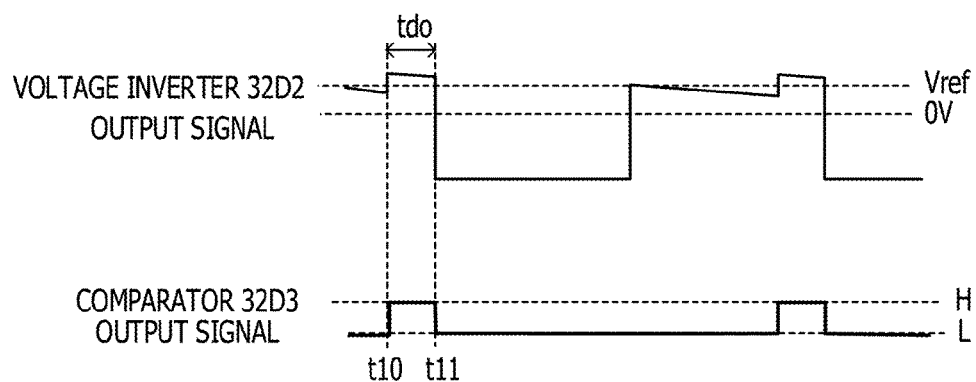
FIG. 8 is a timing chart illustrating an example of an output signal, a reference voltage of a voltage inverter, and an output signal of a comparator.

FIG. 8 is a timing chart illustrating an example of the output signal of the voltage inverter, the reference voltage, and the output signal of the comparator. The voltage value of the output signal of the voltage inverter 32*d*2 is higher than the reference voltage Vref during the ON period tdo in which the diode 15*b* is switched on.

Therefore, the output signal of the comparator 32*d*3 is a pulse signal including an H level during the ON period tdo (for example, a period from the timing t10 to the timing t11 in FIG. 8). The pulse width of the pulse signal is wider for a longer ON period tdo. That is, the pulse width reflects the ON period tdo.

Figure 9:
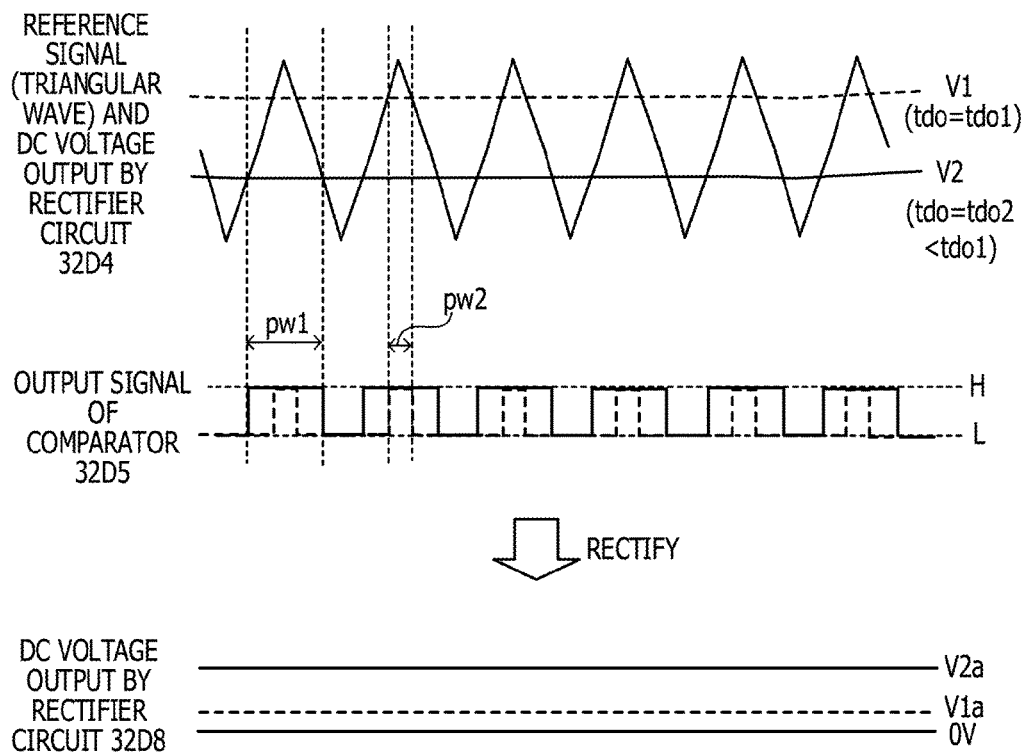
FIG. 9 is a timing chart illustrating an example of a DC voltage, a reference signal (triangle wave) output by a first rectifier circuit, an output signal of a comparator, and a DC voltage output by a second rectifier circuit.

The DC voltage output by the rectifier circuit 32*d*4 is higher for a longer pulse width (that is, a longer ON period tdo). FIG. 9 is a timing chart illustrating an example of the DC voltage output by the first rectifier circuit, the reference signal (triangular wave), the output of the comparator, and the DC voltage output by the second rectifier circuit.

A voltage V1 indicates a DC voltage output by the rectifier circuit 32*d*4 when the ON period tdo is tdo1, and a voltage V2 indicates a DC voltage output by the rectifier circuit 32*d*4 when the ON period tdo is tdo2 (smaller than tdo1).

For a smaller DC voltage output by the rectifier circuit 32*d*4 is, the period in which the DC voltage is lower than the reference signal becomes longer. Thus, the pulse width of the output signal of the comparator 32*d*5 becomes longer. For example, the pulse width pw1 when the DC voltage output by the rectifier circuit 32*d*4 is the voltage V2 is longer than the pulse width pw2 when the DC voltage is the voltage V1.

The rectifier circuit 32*d*8 that receives such an output signal of the comparator 32*d*5 via the coupler 32*d*7 outputs a lower DC voltage for a shorter pulse width of the output signal of the comparator 32*d*5, as illustrated in FIG. 9. For example, the rectifier circuit 32*d*8 outputs a voltage V2*a* as a DC voltage when the output signal of the comparator 32*d*5 is a pulse signal of the pulse width pw1 and outputs a voltage V1*a* as a DC voltage when the output signal of the comparator 32*d*5 is a pulse signal of the pulse width pw2.

The voltages V1 and V2 are generated in accordance with the output signal (pulse signal) of the comparator 32*d*3 whose frequency depends on the cycle of occurrence of the ON period of the diode 15*b* and slightly fluctuates with time causing an error as illustrated in FIG. 9. By increasing the frequency of the triangular wave, it is possible to increase the frequency of the pulse signal output from the comparator 32*d*5 and increase accuracy of the voltages V1*a* and V2*a* output by the rectifier circuit 32*d*8 in accordance with the pulse signal.

Since the DC voltage output by the rectifier circuit 32*d*8 is lower for a longer ON period tdo of the diode 15*b*, however, the voltage inverter 32*d*9 performs voltage inversion such that the control signal cnt having a higher voltage value is output for a lower DC voltage output by the rectifier circuit 32*d*8.

Thereby, a longer ON period tdo causes the control signal cnt having a higher voltage value to be supplied to the waveform shaper 31. Since the capacitance values of the variable capacitor elements 31*a* and 31*d* illustrated in FIG. 5 are smaller for a higher voltage value of the control signal cnt as described above, for example, this causes a shorter delay time with respect to the control voltage Vg1*a* output by the primary-side control IC 11. Such a shorter delay time results in a shorter ON period tdo of the diode 15*b*.

As discussed above, control such that the delay time is shorter for a longer ON period tdo minimizes the ON period tdo of the diode 15*b* per cycle of the switching operation of the transistor 15*a*.

Figure 10:
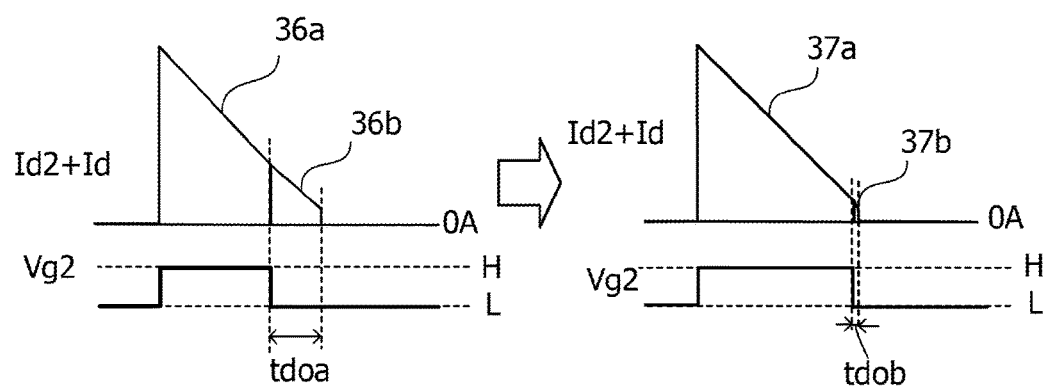
FIG. 10 is a diagram illustrating an example of a reduced ON period of a diode.

FIG. 10 is a diagram illustrating an example of a reduced ON period of the diode. FIG. 10 illustrates current waveforms of the drain current Id2 and the diode current Id and a voltage waveform of the gate voltage Vg2. Waveforms 36*a* and 37*a* indicate the drain current Id2 of the transistor 15*a*, and waveforms 36*b* and 37*b* indicate the diode current Id.

As illustrated in the waveform 37*b*, the ON period of the diode 15*b* being reduced from a period tdoa to a period tdob results in a reduction in a period in which the diode current Id flows. This may reduce a power loss due to the diode current Id, and the same advantage as that of the switching power supply device 10 of the first embodiment may be obtained.

Example Application to AC/DC Converter

The switching power supply device 30 as described above may be used as an AC/DC converter.

Figure 11:
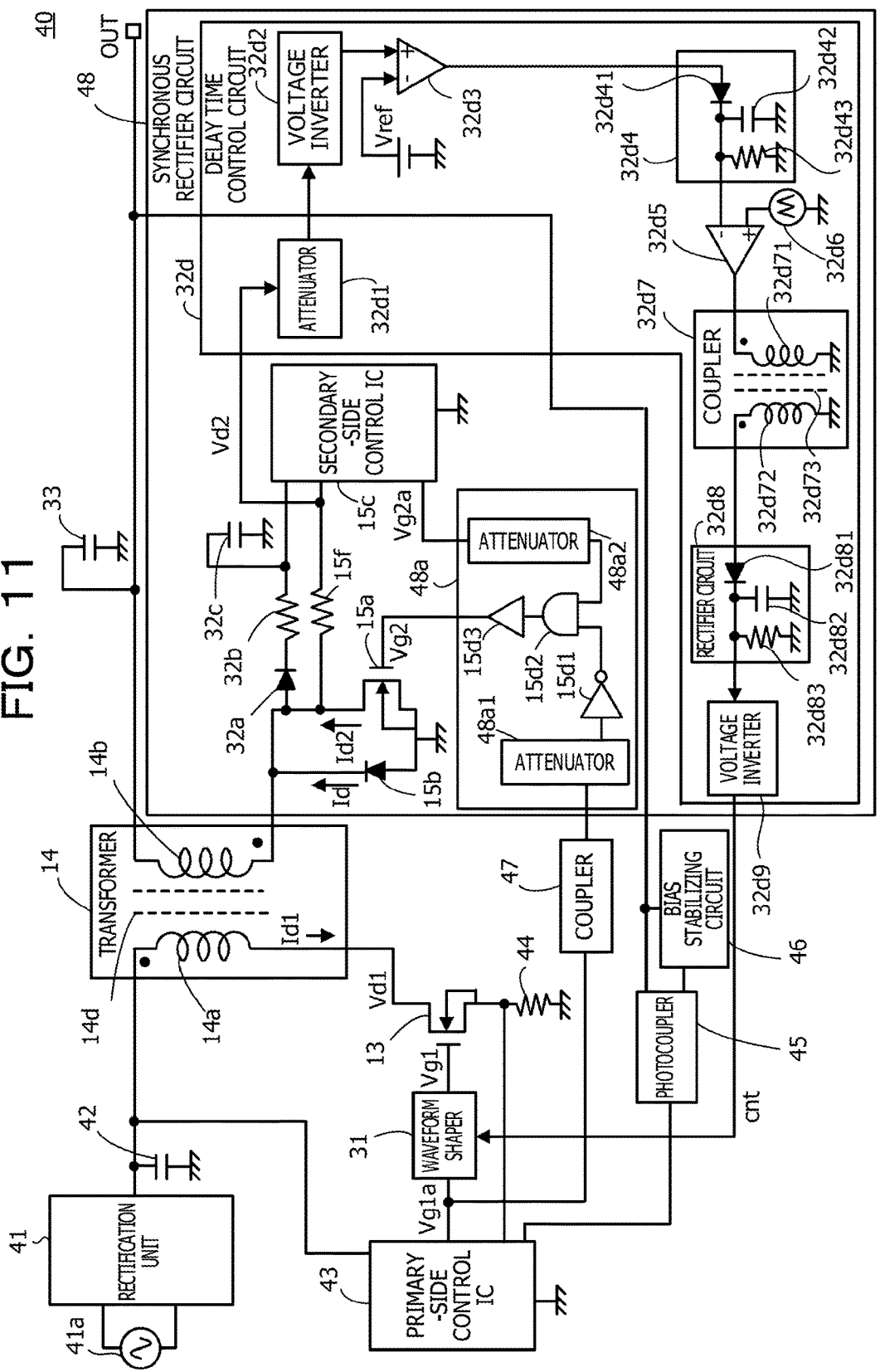
FIG. 11 is a diagram illustrating an example of a fly-back AC/DC converter.

FIG. 11 is a diagram illustrating an example of a flyback AC/DC converter. In FIG. 11, the same elements as those illustrated in FIG. 4 are labeled with the same references. An AC/DC converter 40 has a rectification unit 41. The rectification unit 41 rectifiers the current voltage and outputs the rectified signal. The rectification unit 41 has a common-mode choke filter connected to an AC power source 41*a*, a diode bridge that rectifies an AC voltage output from the common-mode choke filter, and a capacitor that smooths the rectified signal output from the diode bridge, for example. The rectification unit 41 may further have a coil that blocks a high frequency signal contained in the rectified signal.

The AC/DC converter 40 further has a capacitor element 42 used for supplying power to a primary-side control IC 43. One end of the capacitor element 42 is connected to the output terminal of the rectifier unit 41, and the other end is connected to the GND.

The primary-side control IC 43 of the AC/DC converter 40 monitors the current flowing out of the source terminal of the transistor 13 by sensing the voltage applied to a resistor element 44 connected between the source terminal of the transistor 13 and the GND. When the sensed current is of an abnormal value, the primary-side control IC 43 stops the switching operation of the transistor 13, for example.

Further, the voltage of the output terminal OUT is fed back to the primary-side control IC 43 via a photocoupler 45, and the duty ratio is adjusted to a suitable value in accordance with the fed back voltage so that the output voltage of the AC/DC converter 40 is maintained at a level. Note that a bias stabilizing circuit 46 that stabilizes the bias is connected to the photocoupler 45.

Further, in the example of the AC/DC converter 40 of FIG. 11, the control voltage Vg1$a$ output by the primary-side control IC 43 is supplied to a control voltage generation circuit 48$a$ of a synchronous rectifier circuit 48 via a coupler 47. The coupler 47 may be a transformer similar to the coupler 32$d$7, for example.

The control voltage generation circuit 48$a$ has an attenuator 48$a$1 that attenuates the control voltage Vg1$a$ supplied via the coupler 47 to a value suitable for the input of the AND circuit 15$d$2. Further, the control voltage generation circuit 48$a$ attenuates the control voltage Vg2$a$ output by the secondary-side control IC 15$c$ to a value suitable for the input of the AND circuit 15$d$2. The attenuators 48$a$1 and 48$a$2 may be implemented by using resistor elements, for example.

Note that the attenuators 48$a$1 and 48$a$2 may not be provided for a certain level of the control voltage Vg1$a$ obtained via the coupler 47 or for a certain level of the control voltage Vg2$a$. The AC/DC converter 40 as described above has the same advantage as that of the switching power supply device 30 illustrated in FIG. 4.

Example Application to DC/DC Converter

Further, the switching power supply device 30 as described above may be used as a DC/DC converter.

Figure 12:
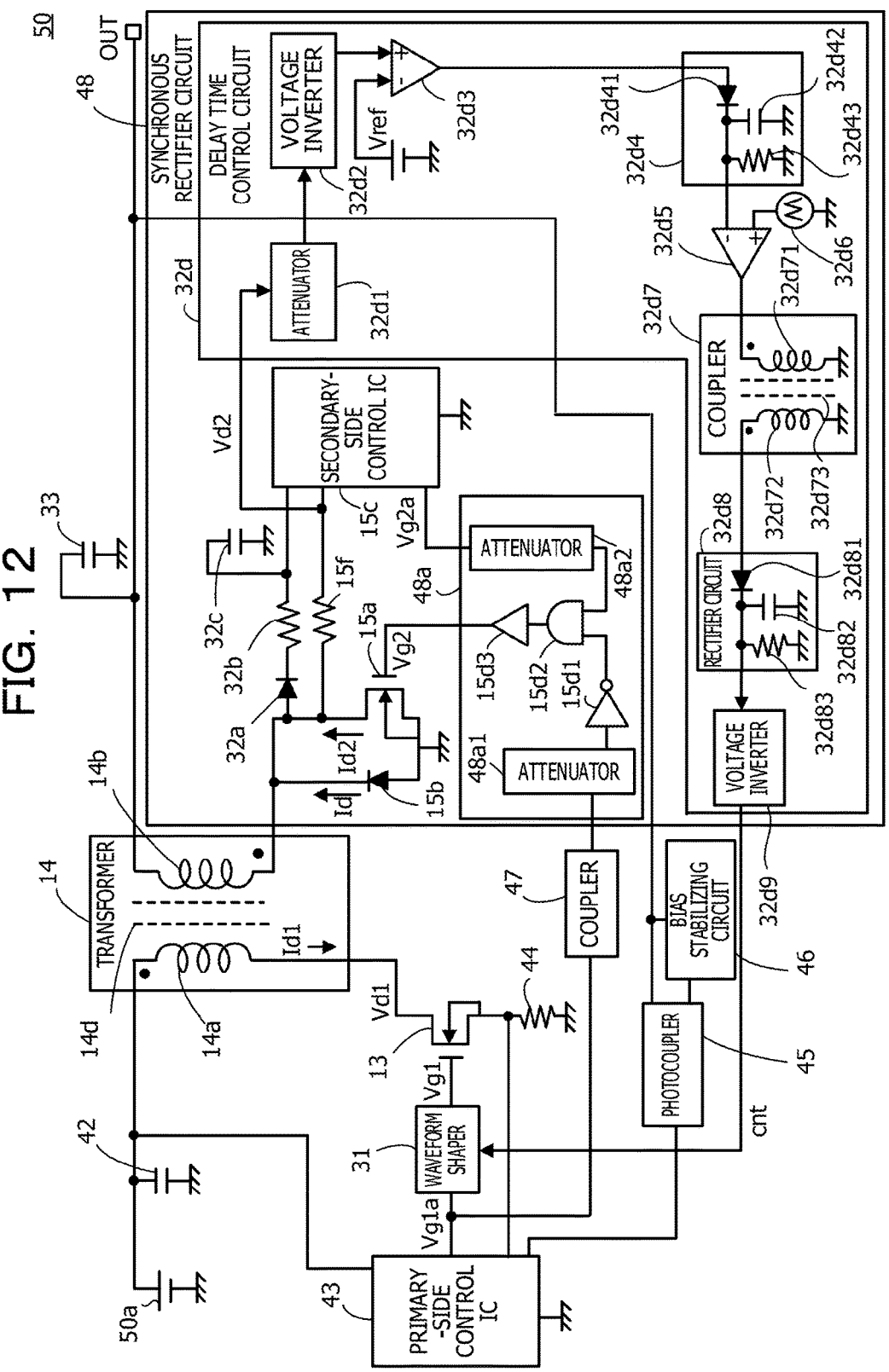
FIG. 12 is a diagram illustrating an example of a DC/DC converter.

FIG. 12 is a diagram illustrating an example of a DC/DC converter. In FIG. 12, the same elements as those illustrated in FIG. 11 are labeled with the same references. A DC/DC converter 50 has substantially the same as the AC/DC converter 40 except that the rectification unit 41 as illustrated in FIG. 11 is not provided and a DC power source 5$a$ is connected to the end of the capacitor element 42.

The DC/DC converter 50 as illustrated in FIG. 12 has the same advantage as that of the switching power supply device 30 illustrated in FIG. 4. As discussed above, one aspect of the synchronous rectifier circuit and the switching power supply device of the embodiment has been described in accordance with the embodiment, such aspect is a mere example and not limited to the above description.

For example, while the transistor 13, 15$a$, and the like of FIG. 1 have been described as being the n-channel FETs, the transistor 13, 15$a$, or the like may be p-channel FET.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A switching power supply device comprising:
a transformer including a primary winding and a secondary winding;
a first transistor coupled to one end of the primary winding;
a first control circuit that outputs a first control voltage used for controlling a switching operation of the first transistor;
a delay circuit that delays the first control voltage and supplies the delayed first control voltage to the first transistor;
a second transistor that has a first terminal coupled to one end of the secondary winding, a second terminal at a reference potential, and a third terminal to which a second control voltage is applied and that performs a switching operation in accordance with the second control voltage;
a diode having a cathode coupled to the one end of the secondary winding and an anode at the reference potential;
a second control circuit that outputs a third control voltage used for controlling a switching operation of the second transistor in accordance with a first voltage of the first terminal;
a control voltage generation circuit that generates the second control voltage in accordance with the first control voltage and the third control voltage; and
a delay time control circuit that determines an ON period in which the diode is switched on in accordance with the first voltage and controls a delay time so that the delay time by which the delay circuit delays the first control voltage is shorter for a longer ON period.

2. The switching power supply device according to claim 1, wherein
the delay time control circuit generates a first pulse signal in which the ON period is reflected by a pulse width in accordance with the first voltage, rectifies the first pulse signal to generate a first DC voltage whose level is in accordance with the pulse width, and generates a control signal used for controlling the delay time in accordance with the first DC voltage.

3. The switching power supply device according to claim 2, wherein
the delay time control circuit generates a third voltage by inverting a polarity of a second voltage proportional to the first voltage when the first transistor is in an on-state and generates the first pulse signal that is a result of comparison between the third voltage with a reference voltage proportional to a product of a current flowing through the first transistor and a resistance of the first transistor when the first transistor is in an on-state.

4. The switching power supply device according to claim 2, wherein
the delay time control circuit generates a second pulse signal in accordance with a result of comparison between the first DC voltage and a triangle wave reference signal and generates the control signal in accordance with a rectified result of the second pulse signal.

5. A synchronous rectifier circuit comprising:
a first transistor having a first terminal coupled to one end of a secondary winding of a transformer included in a synchronous-rectifying switching power supply device, a second terminal at a reference potential, and a third terminal to which a first control voltage is applied and that performs a switching operation in accordance with the first control voltage;

a diode having a cathode coupled to the one end of the secondary winding and an anode at the reference potential;

a first control circuit that outputs a second control voltage used for controlling a switching operation of the first transistor;

a control voltage generation circuit that generates the first control voltage in accordance with the second control voltage and a third control voltage outputted by a second control circuit that controls a switching operation of a second transistor coupled to one end of a primary winding of the transformer; and a delay time control circuit that determines an ON period in which the diode is switched on in accordance with the first voltage and controls a delay time so that the delay time by which a delay circuit coupled between the second control circuit and the second transistor delays the third control voltage is shorter for a longer ON period.

* * * * *